(No Model.)

J. E. BINKLEY.
INSECT DESTROYER.

No. 261,127. Patented July 18, 1882.

Attest:
F. H. Schott
J. A. Stockman

Inventor:
James E. Binkley
C. H. Watson & Co.
Atty's

N. PETERS, Photo-Lithographer, Washington, D. C.

UNITED STATES PATENT OFFICE.

JAMES E. BINKLEY, OF COLUMBUS, TEXAS.

INSECT-DESTROYER.

SPECIFICATION forming part of Letters Patent No. 261,127, dated July 18, 1882.

Application filed May 16, 1882. (No model.)

*To all whom it may concern:*

Be it known that I, JAS. E. BINKLEY, a citizen of the United States, residing at Columbus, in the county of Colorado and State of Texas, have invented certain new and useful Improvements in Insect-Destroyers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for distributing liquid poison on cotton and other plants to destroy insect life thereon; and it consists in the construction and arrangement of parts, as will be hereinafter more fully described and claimed.

Figure 1:
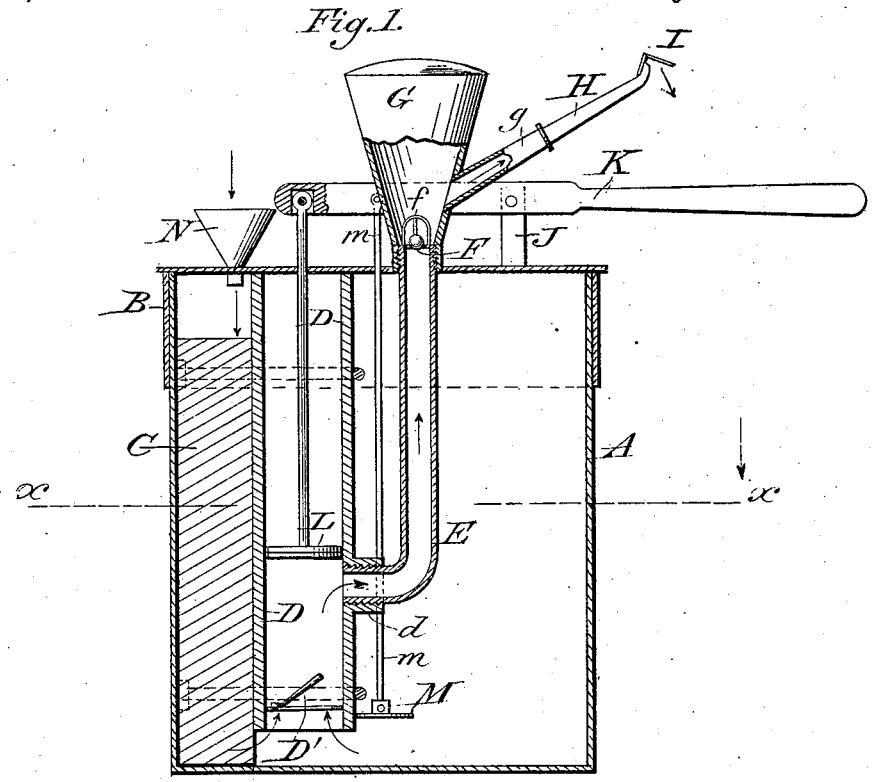
Figure 2:
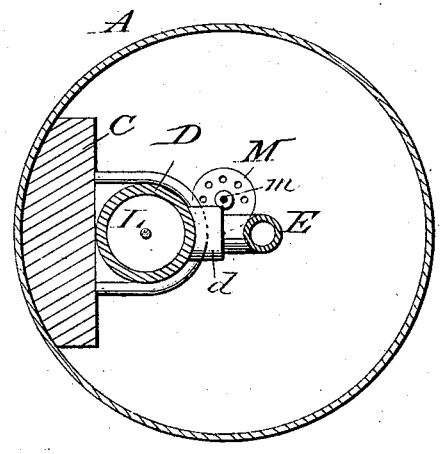
Figure 3:
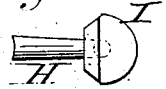

In the annexed drawings, Figure 1 is a vertical sectional elevation of my device. Fig. 2 is a sectional plan on line $x\,x$ of Fig. 1; and Fig 3 is a detail illustrating the spray-nozzle.

Like letters indicate like parts in the several views.

A represents a tank or casing, which is provided with a removable cover, B. This tank or casing A and its cover B may be constructed of tin or other suitable material.

Bolted to one side of and within the tank A is a block of wood or other suitable material, C, to which a pipe or tube, D, is suitably attached. This tube D extends from the top of the tank to a point near the bottom of the same, and is provided at or near its lower end with a clack-valve, D', constructed of metal and rubber.

A threaded tubular projection, $d$, is formed upon the tube D at a suitable distance above its lower end, and in this projection $d$ is inserted the lower bent end of a vertical tube, E, which extends a slight distance above the tank. The ends of this tube E are threaded.

A ball-valve, F, is seated in the upper end of the vertical tube E, which is provided with a guard, $f$, that limits the play of said ball-valve.

A supplemental chamber, G, which is preferably of an inverted-cone shape, as shown in Fig. 1, is screwed upon the upper end of the vertical tube E, and to its projecting arm $g$ is attached a nozzle, H, which is provided with a hood or cap, I, that is inclined so as to throw the liquid in a spray upon the plants to be treated.

The cover B of the tank A is provided with a standard, J, to which a lever, K, is pivoted.

A plunger, L, is attached to one end of said lever K, and is adapted to play in the tube or pipe D.

A dasher, M, is also attached to the lever K by means of the rod $m$ at a point between the plunger L and standard J. This dasher M serves to stir the compound and keep the poison suspended in the liquid.

The cover B may also be provided with a funnel, N, by means of which the liquid may be introduced into the tank or receptacle A.

The cover B is provided with perforations, through which the vertical tube, the plunger and dasher rods, and the funnel project.

Instead of bending the lower end of the tube E, I may use an elbow-tube having threaded ends, one end of which is attached to the projection $d$ of the pipe or tube D and the other end to the lower threaded end of the vertical tube E; and I may also break the tube D above the projection $d$ and connect these portions by means of screw-threads. By reason of the several parts being threaded, as above described, any one part can be detached from the others with but little trouble.

I deem it preferable to construct the pump portions of my device of gas-pipe.

Heretofore great trouble has been experienced in using devices of this class by reason of the nozzle becoming clogged and stopping the operation of the device; but by the use of my nozzle and spray this difficulty is entirely overcome, as the opening in the end of the nozzle is large enough to pass any substance which ordinarily passes the tubes, and the liquid striking against the hood will be thrown upon the plants in the form of a spray.

It will be seen that by operating the lever K the plunger L will be raised and lowered, and the liquid, in which the poison is kept suspended by the movement of the dasher M, ejected from the nozzle H upon the plants to be treated.

From the foregoing description, in connection with the drawings, the operation of my device will be readily understood.

Having thus described my invention, what I claim as new, and desire to secure by Letters Patent, is—

1. In a device for distributing liquid poisons to plants, the combination, with the tank A, bearing C, pipe D, having projection d and valve D', vertical tube E, having valve F and guard f, and chamber G, having nozzle H and hood I, of the perforated removable cover B, having standard J, lever K, plunger L, and dasher M, substantially as shown and described.

2. The combination of the covered tank A, tubes D E, having suitable valves, chamber G, attached to the upper end of the tube E, and having a nozzle, H, provided with hood I, and the plunger L, dasher M, and lever K, substantially as and for the purpose described.

In testimony whereof I affix my signature in presence of two witnesses.

JAS. E. BINKLEY.

Witnesses:
FRIENCH SIMPSON,
JNO. HUGHES.